US011568347B2

(12) United States Patent
Jia et al.

(10) Patent No.: US 11,568,347 B2
(45) Date of Patent: Jan. 31, 2023

(54) METHOD AND APPARATUS FOR PROCESSING RISK-MANAGEMENT FEATURE FACTORS, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Zhuang Jia, Beijing (CN); Hanchenxi Xu, Beijing (CN); Haocheng Liu, Beijing (CN); Yuan Li, Beijing (CN); Lingpeng Fang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 235 days.

(21) Appl. No.: 17/126,826

(22) Filed: Dec. 18, 2020

(65) Prior Publication Data
US 2021/0390468 A1   Dec. 16, 2021

(30) Foreign Application Priority Data
Jun. 12, 2020 (CN) .......................... 202010537704.8

(51) Int. Cl.
 *G06Q 10/06* (2012.01)
 *G06F 40/20* (2020.01)
 *G06N 7/00* (2006.01)

(52) U.S. Cl.
 CPC ......... *G06Q 10/0635* (2013.01); *G06F 40/20* (2020.01); *G06N 7/005* (2013.01)

(58) Field of Classification Search
 CPC ..... G06N 7/005; G06F 40/20; G06Q 10/0635
 See application file for complete search history.

(56) References Cited

U.S. PATENT DOCUMENTS

2012/0221485 A1   8/2012   Leidner et al.
2017/0018030 A1*  1/2017   Crouspeyre .......... G06Q 40/025
(Continued)

OTHER PUBLICATIONS

Credit Risk Evaluation Based on Social Media; Fei et al.; 2015 (Year: 2015).*

(Continued)

*Primary Examiner* — Deirdre D Hatcher
(74) *Attorney, Agent, or Firm* — Brooks Kushman P.C.

(57) ABSTRACT

A method and apparatus for processing risk-management feature factors based on user generated content (UGC), an electronic device and a storage medium are disclosed, which relates to the fields of artificial intelligence and cloud computing. An implementation includes generating a feature expression of the UGC based on the UGC; and extracting the risk-management feature factors of the UGC according to a pre-generated risk-management-feature-factor extracting model and the feature expression of the UGC. According to the technology of the present application, the risk-management feature factors of a corresponding user may be extracted based on the UGC without depending on privacy information of the user, such as personal basic attributes, or the like, such that subsequent related processing actions of risk management may be facilitated, an acquiring way and an acquiring mode of the risk-management feature factors may be enriched effectively, and richer information of the risk-management feature factors may be acquired.

13 Claims, 6 Drawing Sheets

(56) References Cited

U.S. PATENT DOCUMENTS

2018/0032870 A1    2/2018  Liu et al.
2018/0248895 A1*   8/2018  Watson .............. G06Q 20/4016
2019/0354855 A1*  11/2019  Kim ........................ G06N 3/08
2020/0151222 A1*   5/2020  Mannar ................ G06K 9/6226

OTHER PUBLICATIONS

Credit Scoring with Social Network Data; Wei et al.; 2015 (Year: 2015).*
Text Mining for Big Data Analysis in Financial Sector: A Literature Review; Bach et al; 2019 (Year: 2019).*
Extended European Search Report of European Application No. EP21164456.2 dated Sep. 21, 2021, 6 pages.

* cited by examiner

METHOD AND APPARATUS FOR PROCESSING RISK-MANAGEMENT FEATURE FACTORS, ELECTRONIC DEVICE AND STORAGE MEDIUM

CROSS-REFERENCE TO RELATED APPLICATIONS

The present application claims the priority of Chinese Patent Application No. 2020105377048, filed on Jun. 12, 2020, with the title of "Method and apparatus for processing risk-management feature factors, electronic device and storage medium." The disclosure of the above application is incorporated herein by reference in its entirety.

TECHNICAL FIELD

The present application relates to a computer technology, and particularly to the fields of artificial intelligence and cloud computing, and in particular, to a method and apparatus for processing risk-management feature factors based on user generated content (UGC), an electronic device and a storage medium.

BACKGROUND

Risk management (or risk control) is an essential link in modern financial institutions, and mainly means that risk managers reduce or lower the probability of risk events by various measures, so as to lower a risk cost and reduce unnecessary losses as many as possible.

At the present stage, with the rise of the Internet and big data and the development of machine learning and deep learning technologies in recent years, a risk management model for modeling the risk probability of a user with basic attribute data of the user has become a mainstream direction of the risk management field. That is, in this method, personal basic attributes of the user are used as risk-management feature factors, and whether the user is a risk user may be predicted using the trained model and the personal basic attributes of the user.

Although the modeling and prediction processes of the risk management model may be realized with the existing method, the existing method still has the following defects: the personal basic attributes of the user, such as age, sex, occupation, assets and other information, are privacy, and are required to be filled in or authorized by the user, and therefore, such data always has a low coverage rate, and particularly, related processing actions of the risk management are always unable to be performed for a new client with insufficient information. Therefore, there is an urgent need to provide a technical solution in which the related processing actions of the risk management may be performed without depending on basic attribute information of the user.

SUMMARY

In order to solve the above-mentioned technical problems, the present application provides a method and apparatus for processing risk-management feature factors based on user generated content (UGC), an electronic device and a storage medium.

According to an aspect of the present application, there is provided a method for processing risk-management feature factors based on UGC, including generating a feature expression of the UGC based on the UGC; and extracting the risk-management feature factors of the UGC according to a pre-generated risk-management-feature-factor extracting model and the feature expression of the UGC.

According to another aspect of the present application, there is provided a method for training a risk management model based on UGC, including extracting risk-management feature factors of each UGC language material in a pre-collected UGC corpus; mining user risk information corresponding to each UGC language material from a user information base; and training the risk management model according to the risk-management feature factors of each UGC language material in the UGC corpus and the corresponding user risk information.

According to still another aspect of the present application, there is provided an electronic device, including at least one processor; and a memory communicatively connected with the at least one processor; wherein the memory stores instructions executable by the at least one processor, and the instructions are executed by the at least one processor to enable the at least one processor to perform a method for processing risk-management feature factors based on user generated content (UGC), wherein the method includes generating a feature expression of the UGC based on the UGC; and extracting the risk-management feature factors of the UGC according to a pre-generated risk-management-feature-factor extracting model and the feature expression of the UGC.

According to yet another aspect of the present application, there is provided an electronic device, including at least one processor; and a memory communicatively connected with the at least one processor; wherein the memory stores instructions executable by the at least one processor, and the instructions are executed by the at least one processor to enable the at least one processor to perform a method for training a risk management model based on UGC, wherein the method includes extracting risk-management feature factors of each UGC language material in a pre-collected UGC corpus; mining user risk information corresponding to each UGC language material from a user information base; and training the risk management model according to the risk-management feature factors of each UGC language material in the UGC corpus and the corresponding user risk information.

According to still another aspect of the present application, there is provided a non-transitory computer-readable storage medium storing computer instructions therein, wherein the computer instructions are used to cause the computer to perform a method for processing risk-management feature factors based on user generated content (UGC), wherein the method includes generating a feature expression of the UGC based on the UGC; and extracting the risk-management feature factors of the UGC according to a pre-generated risk-management-feature-factor extracting model and the feature expression of the UGC.

According to still another aspect of the present application, there is provided a non-transitory computer-readable storage medium storing computer instructions therein, wherein the computer instructions are used to cause the computer to perform a method for training a risk management model based on UGC, wherein the method includes extracting risk-management feature factors of each UGC language material in a pre-collected UGC corpus; mining user risk information corresponding to each UGC language material from a user information base; and training the risk management model according to the risk-management feature factors of each UGC language material in the UGC corpus and the corresponding user risk information.

According to the technology of the present application, the risk-management feature factors of a corresponding user may be extracted based on the UGC without depending on privacy information of the user, such as personal basic attributes, or the like, such that subsequent related processing actions of risk management may be facilitated, an acquiring way and an acquiring mode of the risk-management feature factors may be enriched effectively, and richer information of the risk-management feature factors may be acquired.

Moreover, according to the technology of the present application, the risk management model may also be trained based on the extracted risk-management feature factors of each UGC language material in the UGC corpus and the user risk information in the user information base; compared with the prior art, the risk management model is trained based on the UGC language material of the user without depending on the privacy information of the user, such as personal basic attribute information, or the like, thus having quite high flexibility and a quite wide application range, and meeting requirements of training the risk management model in all fields in which UGC data of the user may be acquired.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present application. In the drawings.

DETAILED DESCRIPTION

The following part will illustrate exemplary embodiments of the present application with reference to the figures, including various details of the embodiments of the present application for a better understanding. The embodiments should be regarded only as exemplary ones. Therefore, those skilled in the art should appreciate that various changes or modifications can be made with respect to the embodiments described herein without departing from the scope and spirit of the present application. Similarly, for clarity and conciseness, the descriptions of the known functions and structures are omitted in the descriptions below.

Figure 1:
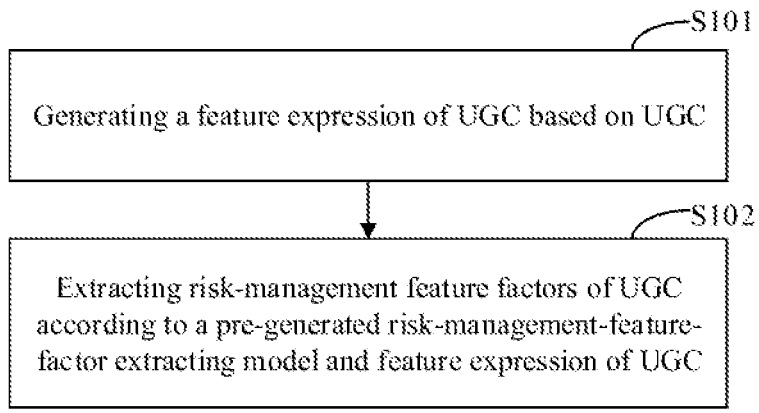
FIG. 1 is a schematic diagram according to a first embodiment of the present application.

FIG. 1 is a schematic diagram according to a first embodiment of the present application; as shown in FIG. 1, this embodiment provides a method for processing risk-management feature factors based on user generated content (UGC), which may include the following steps:

S101: generating a feature expression of the UGC based on the UGC; and

S102: extracting the risk-management feature factors of the UGC according to a pre-generated risk-management-feature-factor extracting model and the feature expression of the UGC.

An apparatus for processing risk-management feature factors based on UGC serves as a performing subject of the method for processing risk-management feature factors based on UGC according to this embodiment, and may be configured as a physical electronic apparatus, an application integrated with software, or the like, and when in use, the application is run on a computer device.

In the prior art, basic attribute information of a user is required to be filled in or authorized by the user, such that the basic attribute information of the user is difficult to acquire, and related risk-management feature factors are unable to be obtained. In this embodiment, it is considered that a large amount of UGC data of the user issued by the user on various platforms or websites exists in the Internet and certainly carries feature information of the user. In this embodiment, based on this feature, the risk-management feature factors based on the UGC are extracted from the UGC data of the user to perform related processing actions of risk management.

Firstly, the feature expression of the UGC is generated based on the UGC, and in practical applications, information is extracted based on a model by means of a vector or matrix. The feature expression of the UGC in this embodiment means that the UGC is expressed as a vector or matrix. For example, in this embodiment, word segmentation may be performed on the UGC first, and then, a one-hot encoding process may be performed on the obtained segmented words by referring to a dictionary library established in advance, so as to obtain the feature expression of the UGC. If the corresponding position of the first segmented word in a dictionary is 11 in the encoding process, a numerical value of 1 is assigned to the corresponding position, and a corresponding numerical value of 0 is assigned to all other positions. The corresponding position of the second segmented word in the dictionary is 17, and meanwhile, a value of 1 is assigned to the corresponding position, a numerical value of 0 is assigned to other positions, and so on, thus obtaining a matrix with the number of rows equal to the total number of the segmented words in the dictionary and the number of columns equal to the length of the UGC subjected to word segmentation. That is, the feature expression of the UGC in this embodiment may be in a matrix form. In practical applications, in order to facilitate a uniform size of the obtained feature expressions of the UGC, the length of all the UGC after word segmentation may be set as a uniform length L. If having a length less than L, the UGC may be filled with zero, and if having a length greater than L, the UGC may be truncated.

In this embodiment, the obtained feature expression of the UGC may be input to the pre-generated risk-management-feature-factor extracting model which extracts the risk-management feature factors of the UGC from the feature expression of the UGC and outputs these factors, such that the risk-management feature factors of the UGC may be extracted based on the UGC data of the user. Compared with the prior art, the risk-management feature factors of the user may be extracted directly based on the UGC of the user without the personal basic attribute information as personal privacy of the user, such as age, sex, occupation, assets, or the like, such that the subsequent related processing actions of risk management are facilitated, with simpler implementation. The risk-management feature factors of the UGC in this embodiment represent factors or features which are extracted from the UGC and capable of representing risk-management feature information of the UGC. The risk-management feature information may be understood as feature information capable of identifying a potential risk.

In the method for processing risk-management feature factors based on UGC according to this embodiment, the feature expression of the UGC is generated based on the UGC; the risk-management feature factors of the UGC are extracted according to the pre-generated risk-management-feature-factor extracting model and the feature expression of the UGC; compared with the prior art, the risk-management feature factors of the corresponding user may be extracted based on the UGC without depending on the privacy information of the user, such as the personal basic attributes, or the like, such that the subsequent related processing actions of the risk management may be facilitated, an acquiring way and an acquiring mode of the risk-management feature factors may be enriched effectively, and richer information of the risk-management feature factors may be acquired.

Figure 2:
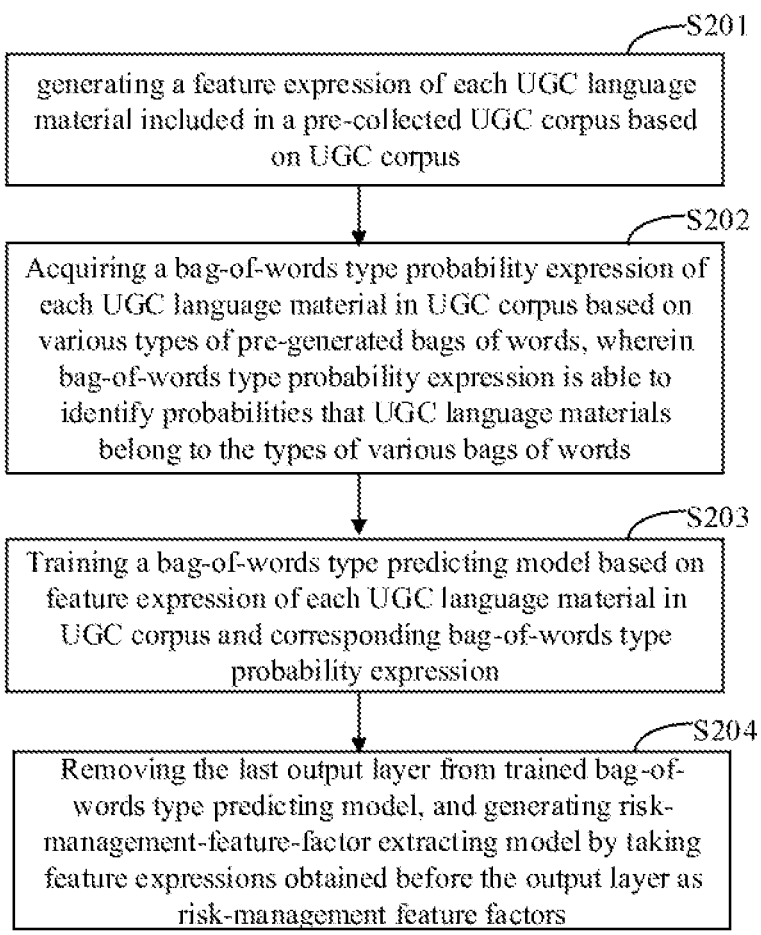
FIG. 2 is a schematic diagram according to a second embodiment of the present application.

FIG. 2 is a schematic diagram according to a second embodiment of the present application; as shown in FIG. 2, this embodiment provides a method for generating a risk-management-feature-factor extracting model, which may include the following steps:

S201: generating a feature expression of each UGC language material included in a pre-collected UGC corpus based on the UGC corpus.

The process of generating the feature expression of each UGC language material may refer to the process of generating the feature expression of the UGC in the embodiment shown in FIG. 1, and is not repeated herein.

S202: acquiring a bag-of-words type probability expression of each UGC language material in the UGC corpus based on various types of pre-generated bags of words, wherein the bag-of-words type probability expression is able to identify the probabilities that the UGC language materials belong to the types of the various bags of words.

For example, the step S202 may include the following steps during implementation:

(1) mining the probabilities that each UGC language material in the UGC corpus belongs to the types of the various types of pre-generated bags of words based on the corresponding UGC language material and the various bags of words.

For example, during implementation, the number of times each UGC language material in the UGC corpus hits the various types of pre-generated bags of words may be first mined based on the corresponding UGC language material and the various types of bags of words; then, the probabilities that the UGC language material belongs to the types of the various bags of words is acquired according to the number of times the UGC language material hits the various types of bags of words.

In this embodiment, the various types of bags of words may be generated in advance, such as a gambling type, an overdue type, an educational type, an examination type, or the like. The types with negative content, such as the gambling type, the overdue type, or the like, have high risks, and the types with positive content, such as the educational type, the examination type, or the like, have low risks. For example, the bag of words of the gambling type may include words related to gambling, such as gambling cheats, wagering, money winning, football gambling, casinos, or the like. Similarly, the bag of words of the examination type may include words related to examinations, such as college entrance examinations, postgraduate qualifying examinations, professional examinations, past examination papers, outlines, registration, or the like. The various types of bags of words may be generated in advance according to actual requirements.

The UGC corpus in this embodiment may include the UGC language material of each user mined based on each forum, website or personal space in the network. Each UGC language material may be a piece of information issued by the user. The number of times each UGC language material hits the various types of bags of words may be counted. For example, taking one UGC language material and one type of bag of words as an example, word segmentation is performed on the UGC language material, all segmented words may be arranged from front to back to obtain a corresponding word sequence, and repeated segmented words are not deleted, and still remain in the sequence in the UGC language material. Then, each segmented word in the word sequence is analyzed from front to back, whether the corresponding segmented word hits the words in the bag of words of this type, and if yes, the number of times of hitting the bag of words of this type is incremented by 1; the step is repeated until all the segmented words in the word sequence are analyzed, and the finally obtained number of times of hitting the bag of words of this type is the number of times the UGC language material hits the bag of words of this type. For each type of bag of words, word segmentation may be performed according to the above-mentioned process, and the number of times the UGC language material hits the various types of bags of words is mined.

According to the number of times the UGC language material hits the bag of words of a certain type, the probability that the UGC language material belongs to the type of the bag of words is acquired, which may be realized according to the following formula:

$$p_i = \text{sigmoid}(N_i + 3) = \frac{1}{1 + \exp(-(N_i + 3))}$$

wherein $p_i$ represents the probability that the current UGC language material belongs to the type of the ith type of bag of words, and $N_i$ is the number of times the UGC language material hits the ith type of bag of words. With the Sigmoid function, the number $N_i$ of matching times of the type of the ith type of bag of words may be normalized, and in order to make the matched probability closer to 1, an offset (for example, 3) may be added to Ni during calculation, thereby obtaining the relative probability $p_i$ that the UGC language material belongs to the type of the bag of words. In the above-mentioned way, the probabilities that each UGC language material belongs to the types of the various bags of words may be obtained.

(2) Splicing the probabilities that the UGC language materials belong to the types of the various bags of words to form the bag-of-words type probability expression of the UGC language materials.

The probabilities that one UGC language material belongs to the types of the various bags of words are spliced to form the bag-of-words type probability expression of the UGC language material. For example, the spliced bag-of-words type probability expression may be a vector having 1×n columns, wherein n is equal to the number of the types of the bags of words. For example, if one UGC language material hits the gambling type of bag of words once and other types of bags of words 0 time, in the way of the above-mentioned embodiment, in the obtained bag-of-words type probability expression, the probability at the position of the gambling type is 0.9820, and the probabilities at other positions are 0.

S203: training a bag-of-words type predicting model based on the feature expression of each UGC language material in the UGC corpus and the corresponding bag-of-words type probability expression.

In the way of the above-mentioned embodiment, the feature expression of each UGC language material and the bag-of-words type probability expression corresponding to this UGC language material may be obtained to form a piece of training data. Several pieces of training data may be constructed similarly. In the training process, the several pieces of training data may be divided into two data sets, a training set and a validation set. In the training process, the bag-of-words type predicting model is trained with the training set, and each training action is scored by referring to the validation set. Then, in contrast to true values of the validation set, the accuracy index of the bag-of-words type predicting model is measured. Finally, parameters of the model are optimized according to indexes on the validation set. That is, the model is trained with the training set and the validation set, the validation set aims at validating the effect of the current model, and then, the optimal parameters may be selected utilizing the indexes of the validation set to realize the training action of the model. In the above-mentioned way, the model may be trained to converge with the model parameters at optimal values.

S204: removing the last output layer from the trained bag-of-words type predicting model, and generating the risk-management-feature-factor extracting model by taking the feature expressions obtained before the output layer as the risk-management feature factors.

In the bag-of-words type predicting model in this embodiment, the last output layer is configured to predict the probability that the UGC belongs to each bag-of-words type based on feature information of the UGC. Based on the principle, in this embodiment, the last output layer in the bag-of-words type predicting model may be removed, such that the feature expression obtained before the output layer may be used as the output of the remaining model. Here, after the last output layer of this bag-of-words type predicting model is removed, output features are used as the risk-management feature factors, and therefore, the obtained model is called the risk-management-feature-factor extracting model. At this moment, in the way of the above-mentioned embodiment, the feature expression of the UGC is input into the risk-management-feature-factor extracting model which then outputs the risk-management feature factors corresponding to the UGC. The bag-of-words type predicting model in this embodiment may be configured as an LSTM, TextCNN, Transformer model, or the like.

In the method for processing risk-management feature factors based on UGC according to this embodiment, the risk-management-feature-factor extracting model may be generated in the above-mentioned way, and then, the risk-management feature factors may be extracted based on the UGC, such that even when the privacy information of the user, such as the personal basic attributes, or the like, is unable to be acquired in the prior art, the corresponding risk-management feature factors are able to be extracted based on the UGC of the user, related processing actions of risk management may be performed without depending on the personal basic attributes of the user, and the flexibility of the processing actions of the risk management may be improved effectively.

Figure 3:
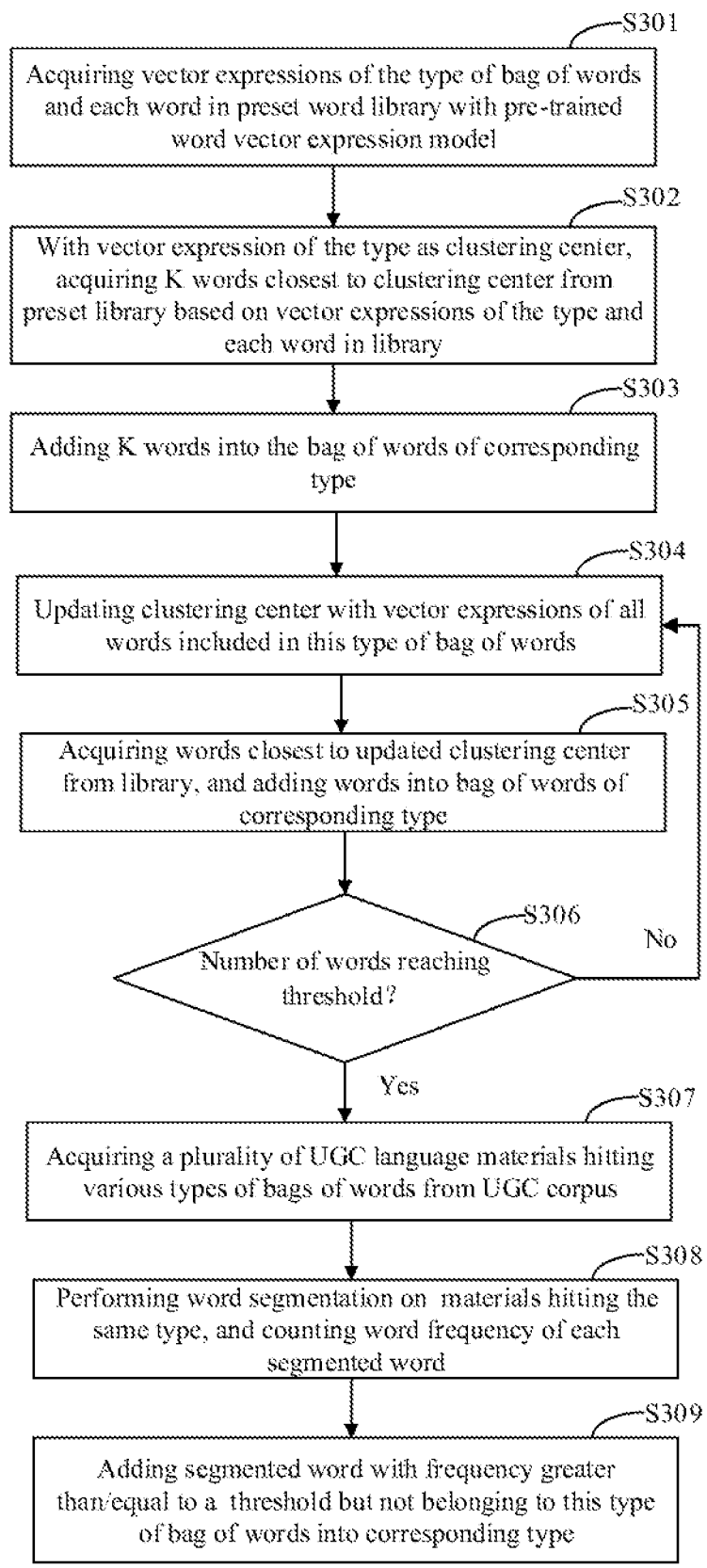
FIG. 3 is a schematic diagram according to a third embodiment of the present application.

FIG. 3 is a schematic diagram according to a third embodiment of the present application; as shown in FIG. 3, this embodiment provides a method for mining various types of bags of words, which may include the following steps:

S301: acquiring vector expressions of the type of the bag of words and each word in a preset word library with a pre-trained word vector expression model.

The preset word library in this embodiment may include all words obtained by mining all language materials in a UGC corpus. In this embodiment, the vector expression of the type of the bag of words may be calculated with models, such as CBOW, SG, ELMo, Bert, or the like, and similarly, the vector expression of each word in the word library may be obtained.

S302: with the vector expression of the type of each bag of words as a clustering center, acquiring K words closest to the clustering center from the preset word library based on the vector expressions of the type of the bag of words and each word in the preset word library;

S303: adding the K words into the bag of words of the corresponding type.

With the vector expression of the type of each type of bag of words as the clustering center, the similarity of the vector expression of each word in the word library and the vector expression of the type of the bag of words is calculated, and then, the words corresponding to K vector expressions with the maximum similarity are added into the bag of words of the corresponding type as the K words closest to the clustering center.

The steps S301-S303 in this embodiment may serve as the first major step of mining the bag of words, and the bag of words obtained at this moment may be used as an initial bag of words, and may also be applied to the above-mentioned embodiment shown in FIG. 2. However, since each type of bag of words obtained at this moment has a small number of words, the various types of bags of words may be further expanded at this moment in the following way.

S304: updating the clustering center with the vector expressions of all the words included in this type of bag of words.

A prototype of each type of bag of words may be obtained through the processing actions in the steps S301-S303, and at this moment, the clustering center may be updated with the vector expressions of all the words included in this type of bag of words, and for example, the vector expressions of all the words included in this bag of words may be averaged to serve as the updated clustering center.

S305: acquiring the words closest to the updated clustering center from the preset word library, and adding the words into the bag of words of the corresponding type;

S306: judging whether the number of the words in this type of bag of words reaches a preset threshold, if so, obtaining this type of bag of words, and further performing step S307; otherwise, returning to the step S304, and repeating the steps until the number of the words included in the bag of words reaches the preset threshold.

In the step S305, the way of obtaining the expanded words in each type of bag of words and adding the words into the corresponding type of bag of words is similar to the implementation way of the above-mentioned step S302, and is not repeated herein.

In this embodiment, the maximum number of the words included in each type of bag of words serves as the preset threshold, may be set according to actual requirements, and is not limited herein.

The steps S304-S305 in this embodiment may serve as the second major step of mining the bag of words, and at this moment, the various types of bags of words may be further expanded based on the initial bags of words obtained in the above-mentioned steps S301-S302. The various types of bags of words obtained at this moment may also be applied to the above-mentioned embodiment shown in FIG. 2.

S307: acquiring a plurality of UGC language materials hitting the various types of bags of words from the UGC corpus.

Any UGC language material having one segmented word capable of hitting a certain type of bag of words may be considered as one UGC language material hitting this type of bag of words. In this way, the plural UGC language materials hitting each type of bag of words may be counted.

S308: performing word segmentation on the plural UGC language materials hitting the same type of bag of words, and counting the word frequency of each segmented word;

S309: adding the segmented word which has a word frequency greater than or equal to a preset frequency threshold but does not belong to this type of bag of words into the corresponding type of bag of words.

The steps S307-S309 serve as a way of further expanding the various types of bags of words, and may further enrich the words included in each bag of words, such that the words included in the various types of bags of words are richer and more comprehensive.

In the method for processing risk-management feature factors based on UGC according to this embodiment, the various types of bags of words may be mined in the above-mentioned way, the words included in the various types of bags of words may be quite rich and comprehensive, and then, the risk-management-feature-factor extracting model may be trained more accurately and effectively based on the various types of bags of words.

Figure 4:
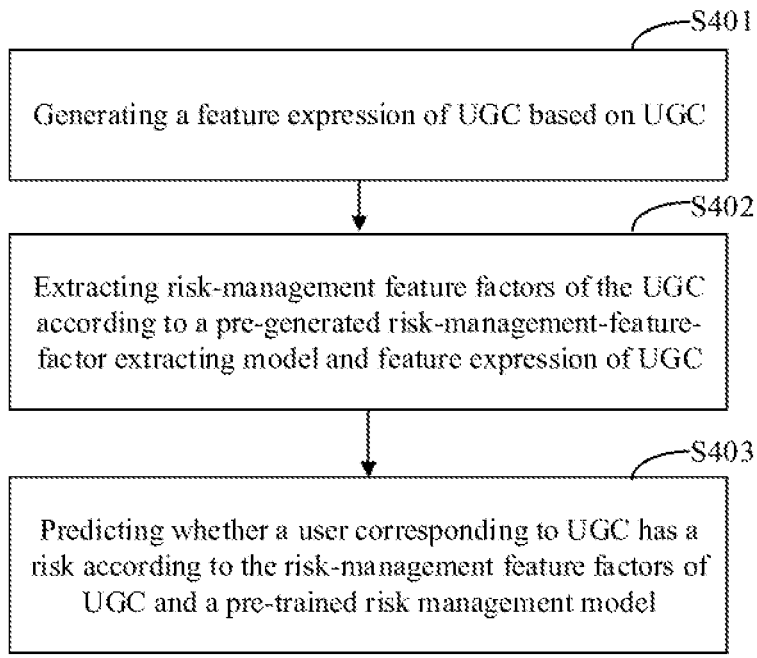
FIG. 4 is a schematic diagram according to a fourth embodiment of the present application.

FIG. 4 is a schematic diagram according to a fourth embodiment of the present application; as shown in FIG. 4, a method for processing risk-management feature factors based on UGC according to this embodiment may include the following steps:

S401: generating a feature expression of the UGC based on the UGC; and

S402: extracting the risk-management feature factors of the UGC according to a pre-generated risk-management-feature-factor extracting model and the feature expression of the UGC.

The implementation of the steps S401-S402 may refer to the description of the above-mentioned embodiment shown in FIG. 1, and is not repeated herein.

S403: predicting whether a user corresponding to the UGC has a risk according to the risk-management feature factors of the UGC and a pre-trained risk management model.

For example, the risk-management feature factors of the UGC may be input into the trained risk management model, and at this moment, the risk management model may predict whether the user corresponding to the UGC has the risk. For example, in the gambling field, whether a user is suspected of a gamble may be predicted based on a certain piece of UGC data for the user. In the field of overdue credit cards, whether a user corresponding to UGC has an overdue credit card may be predicted according to a piece of UGC data of the user, such that a financial department may timely make risk management according to the predicted result, so as to reduce risks effectively.

In the method for processing risk-management feature factors based on UGC according to this embodiment, in the above-mentioned way, the risk-management feature factors of the corresponding user may be extracted based on the UGC without depending on the privacy information of the user, such as the personal basic attributes, or the like, and whether this user has a risk may be predicted based on the pre-trained risk management model, such that risk management may be timely performed subsequently based on the prediction result, and effective risk management may be performed based on the UGC of the user without depending on the privacy information of the user, such as any personal basic attribute, or the like, with quite flexible and convenient utilization.

Figure 5:
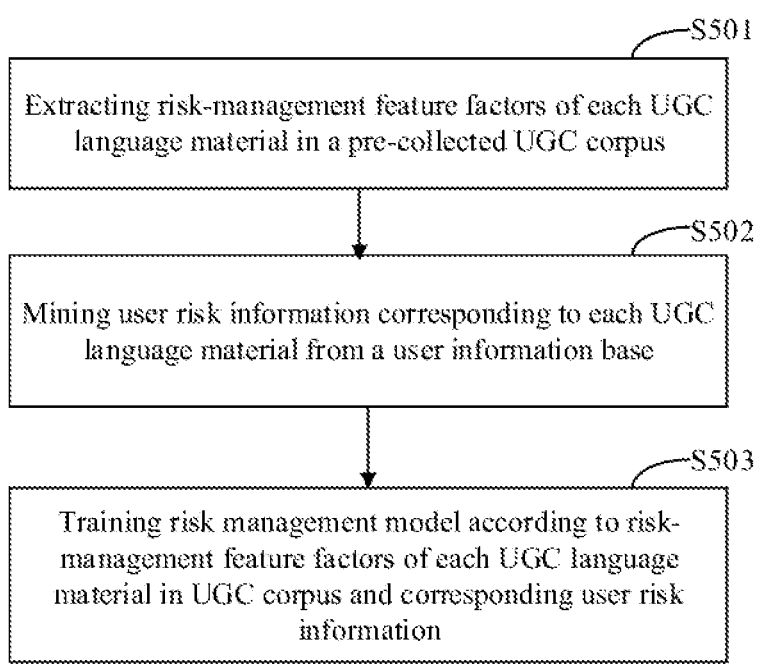
FIG. 5 is a schematic diagram according to a fifth embodiment of the present application.

FIG. 5 is a schematic diagram according to a fifth embodiment of the present application; as shown in FIG. 5, this embodiment provides a method for training a risk management model based on UGC, which may include the following steps:

S501: extracting risk-management feature factors of each UGC language material in a pre-collected UGC corpus.

Specifically, the risk-management feature factors corresponding to each UGC language material may be acquired in the manner of the above-mentioned embodiment.

S502: mining user risk information corresponding to each UGC language material from a user information base; and S503: training the risk management model according to the risk-management feature factors of each UGC language material in the UGC corpus and the corresponding user risk information.

The user information base in this embodiment may belong to a certain financial management institution, for example, a credit card department of a certain bank, and may record overdue credit card information of all users of the bank. Alternatively, the user information base may belong to an official public security management institution, and information of all users suspected of a gamble is counted.

Specifically, the risk management model applicable to one institution may be trained with the user information base of this institution. For example, the risk management model suitable for the bank may be trained with the user information base of a credit card center of the bank in conjunction with the risk-management feature factors of each UGC language material, so as to predict an overdue risk of a certain user according to the UGC of the user. Similarly, the risk management model suitable for the public security management institution may be trained with information of a gambling user of the public security management institution in conjunction with the risk-management feature factors of each UGC language material, so as to predict whether the user is suspected of the gamble according to the UGC of the user. Certainly, user information bases in other fields may also be adopted to train risk management models applicable to the corresponding fields, which is not repeated herein.

In addition, it should be noted that in this embodiment, when the risk information of the user corresponding to each UGC language material is mined from the user information base, other information is required to be consulted to determine that the UGC language material and the risk information of the user must correspond to each other. Firstly, identification information of the user must be referred to, and the information belonging to the same user, such as a mobile phone number, an identity card number or other information of the user, must be guaranteed to be capable of identifying the user as the same user. Secondly, time information may be referred to; since the UGC issued by the user has timeliness, the time when the UGC is issued corresponds to the time information, and the UGC may only identify the feature information of the user at the issuing time. If a time difference is greater than a certain preset time threshold, for example, the UGC of the user in a certain month of the last year is adopted, the probability of accurately predicting whether a credit card of the user is overdue in the current month is smaller, and the current feature information of the user may be more accurately represented by a certain piece of UGC data of the user in the current month, such that a certain rule may be set to prevent the time difference between the time information of the UGC and the risk information of the user from being greater than the preset time threshold, so as to accurately mine the user risk information corresponding to each UGC language material from the user information base.

In this embodiment, when the risk management model is trained, the risk information of the user is used as annotated data, the probability of occurrence of the corresponding risk is 1, and the probability of avoidance of the corresponding risk may be 0. The risk-management feature factors of each UGC language material are input into the risk management model which may predict the probability of the risk of the corresponding user. Then, the prediction result is compared with the annotated result, and if the prediction result is inconsistent with the annotated result, the parameters of the risk management model are adjusted to make the prediction result consistent with the annotated result. In the above-mentioned way, the risk management model is continuously trained with the plural pieces of training data, such that the optimal parameters of the risk management model may be determined, thereby determining the trained risk management model.

In the method for training a risk management model based on UGC according to this embodiment, in the above-mentioned way, the risk management model may be trained based on the extracted risk-management feature factors of each UGC language material in the UGC corpus and the user risk information in the user information base; compared with the prior art, the risk management model is trained based on the UGC language material of the user without depending on the privacy information of the user, such as the personal basic attribute information, or the like, thus having quite high flexibility and a quite wide application range, and meeting requirements of training the risk management model in all fields in which the UGC data of the user may be acquired.

Figure 6:
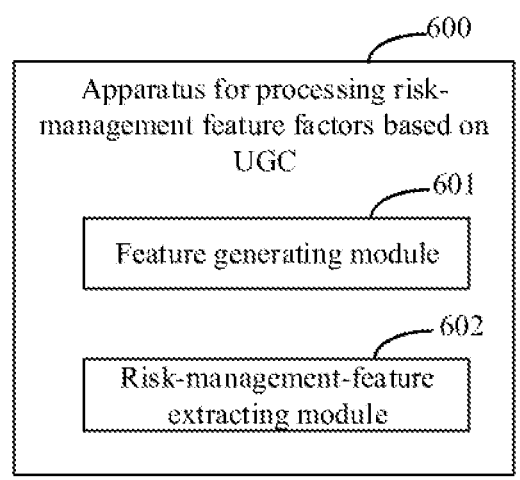
FIG. 6 is a schematic diagram according to a sixth embodiment of the present application.

FIG. 6 is a schematic diagram according to a sixth embodiment of the present application; as shown in FIG. 6, this embodiment provides an apparatus 600 for processing risk-management feature factors based on UGC, including a feature generating module 601 configured to generate a feature expression of the UGC based on the UGC; and a risk-management-feature extracting module 602 configured to extract the risk-management feature factors of the UGC according to a pre-generated risk-management-feature-factor extracting model and the feature expression of the UGC.

The apparatus 600 for processing risk-management feature factors based on UGC according to this embodiment has the same implementation as the above-mentioned relevant method embodiment by adopting the above-mentioned modules to implement the implementation principle and the technical effects of processing the risk-management feature factors based on the UGC, detailed reference may be made to the above-mentioned description of the relevant method embodiment, and details are not repeated herein.

Figure 7:
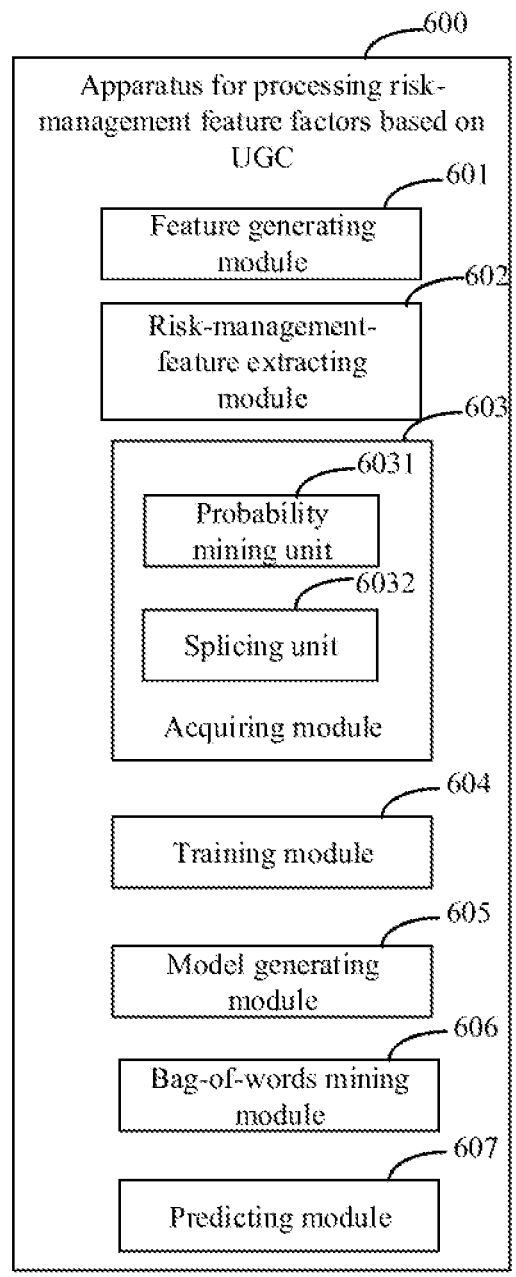
FIG. 7 is a schematic diagram according to a seventh embodiment of the present application.

FIG. 7 is a schematic diagram according to a seventh embodiment of the present application; as shown in FIG. 7, the technical solution of the apparatus 600 for processing risk-management feature factors based on UGC according to this embodiment of the present application is further described in more detail based on the technical solution of the above-mentioned embodiment shown in FIG. 6.

As shown in FIG. 7, the apparatus 600 for processing risk-management feature factors based on UGC according to this embodiment further includes an acquiring module 603, a training module 604 and a model training module 605.

The feature generating module 601 is further configured to generate a feature expression of each UGC language material included in a pre-collected UGC corpus based on the UGC corpus.

The acquiring module 603 is configured to acquire a bag-of-words type probability expression of each UGC language material in the UGC corpus based on various types of pre-generated bags of words, and the bag-of-words type probability expression is able to identify the probability that the UGC language material belongs to the types of the various bags of words.

The training module 604 is configured to train a bag-of-words type predicting model based on the feature expression of each UGC language material in the UGC corpus and the corresponding bag-of-words type probability expression.

The model generating module 605 is configured to remove the last output layer from the trained bag-of-words type predicting model, and generate the risk-management-feature-factor extracting model by taking the feature expressions obtained before the output layer as the risk-management feature factors.

Further optionally, as shown in FIG. 7, in the apparatus 600 for processing risk-management feature factors based on UGC according to this embodiment, the acquiring module 603 includes a probability mining unit 6031 configured to mine the probabilities that each UGC language material in the UGC corpus belongs to the types of the various types of pre-generated bags of words based on the corresponding UGC language material and the various bags of words; and a splicing unit 6032 configured to splice the probabilities that the UGC language materials belong to the types of the various bags of words to form the bag-of-words probability expression of the UGC language materials.

Further optionally, the probability mining unit 6031 is configured to mine the number of times each UGC language material in the UGC corpus hits the various types of pre-generated bags of words based on the corresponding UGC language material and the various types of bags of words; and acquire the probabilities that the UGC language material belongs to the types of the various bags of words according to the number of times the UGC language material hits the various types of bags of words.

Further optionally, as shown in FIG. 7, the apparatus 600 for processing risk-management feature factors based on UGC according to this embodiment further includes a bag-of-words mining module 606 configured to mine various types of bags of words; Further, the bag-of-words mining module 606 is configured to acquire vector expressions of the type of the bag of words and each word in a preset word library with a pre-trained word vector expression model; with the vector expression of the type of the bag of words as a clustering center, acquire K words closest to the clustering center from the preset word library based on the vector expressions of the type of the bag of words and each word in the preset word library; and add the K words into the bag of words of this type.

Further optionally, the bag-of-words mining module 606 is further configured to update the clustering center with the vector expressions of all the words included in the bag of words; acquire the words closest to the updated clustering center from the preset word library, add the words into the bag of words of this type, and repeat the steps until the number of the words included in the bag of words reaches the preset threshold.

Further optionally, the bag-of-words mining module 606 is further configured to acquire a plurality of UGC language materials hitting the various types of bags of words from the UGC corpus; perform word segmentation on the plural UGC language materials hitting the same type of bag of words, and count the word frequency of each segmented word; and add the segmented word which has a word frequency greater than or equal to a preset frequency threshold but does not belong to this type of bag of words into the corresponding type of bag of words.

Further optionally, as shown in FIG. 7, the apparatus 600 for processing risk-management feature factors based on UGC according to this embodiment further includes a predicting module 607 configured to predict whether a user corresponding to the UGC has a risk according to the risk-management feature factors of the UGC and a pre-trained risk management model.

The apparatus 600 for processing risk-management feature factors based on UGC according to this embodiment has the same implementation as the above-mentioned relevant method embodiment by adopting the above-mentioned modules to implement the implementation principle and the technical effects of processing the risk-management feature factors based on the UGC, detailed reference may be made to the above-mentioned description of the relevant method embodiment, and details are not repeated herein.

Figure 8:
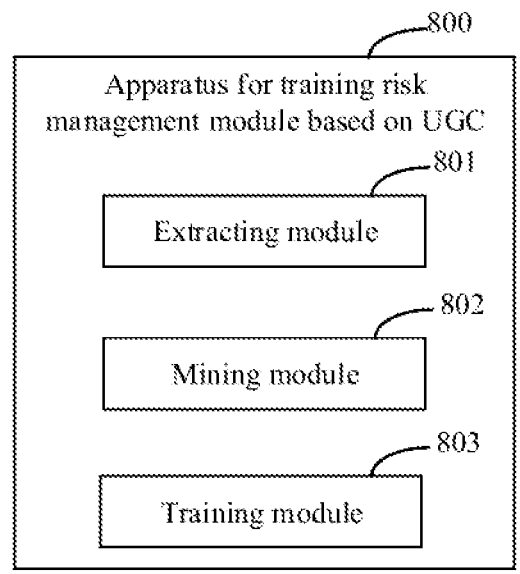
FIG. 8 is a schematic diagram according to an eighth embodiment of the present application.

FIG. 8 is a schematic diagram according to an eighth embodiment of the present application; as shown in FIG. 8, this embodiment provides an apparatus 800 for training a risk management model based on UGC, including an extracting module 801 configured to extract risk-management feature factors of each UGC language material in a pre-collected UGC corpus; a mining module 802 configured to mine user risk information corresponding to each UGC language material from a user information base; and a training module 803 configured to train the risk management model according to the risk-management feature factors of each UGC language material in the UGC corpus and the corresponding user risk information.

The apparatus 800 for training a risk management module based on UGC according to this embodiment has the same implementation as the above-mentioned relevant method embodiment by adopting the above-mentioned modules to implement the implementation principle and the technical effects of training the risk management model based on the UGC, detailed reference may be made to the above-mentioned description of the relevant method embodiment, and details are not repeated herein.

According to the embodiments of the present application, there are also provided an electronic device and a readable storage medium.

Figure 9:
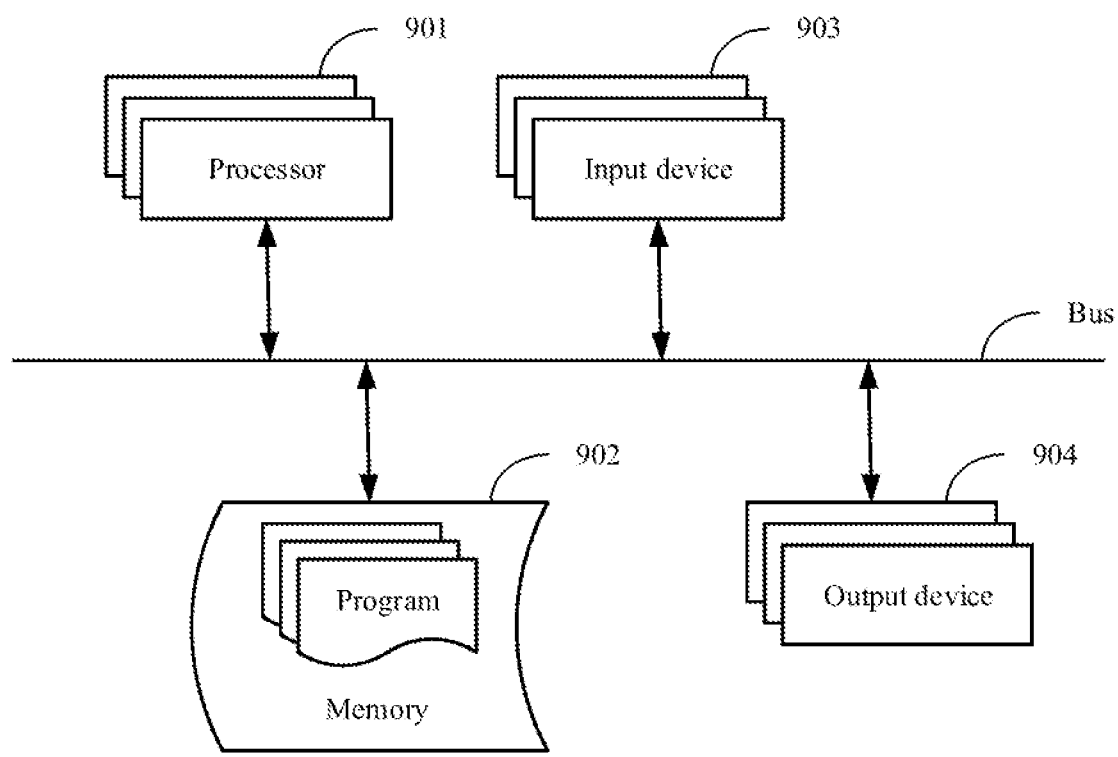
FIG. 9 is a block diagram of an electronic device configured to implement the above-mentioned method according to the embodiments of the present application.

FIG. 9 is a block diagram of an electronic device configured to implement the above-mentioned method according to the embodiments of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital processors, cellular telephones, smart phones, wearable devices, and other similar computing apparatuses. The components shown herein, their connections and relationships, and their functions, are meant to be exemplary only, and are not meant to limit implementation of the present application described and/or claimed herein.

As shown in FIG. 9, the electronic device includes one or more processors 901, a memory 902, and interfaces configured to connect the various components, including high-speed interfaces and low-speed interfaces. The various components are interconnected using different buses and may be mounted at a common motherboard or in other manners as desired. The processor may process instructions for execution within the electronic device, including instructions stored in or at the memory to display graphical information for a GUI at an external input/output device, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 9, one processor 901 is taken as an example.

The memory 902 is configured as the non-transitory computer readable storage medium according to the present application. The memory stores instructions executable by the at least one processor to cause the at least one processor to perform a method for processing risk-management feature factors based on UGC or a method for training a risk management model based on UGC according to the present application. The non-transitory computer readable storage medium according to the present application stores computer instructions for causing a computer to perform the method for processing risk-management feature factors based on UGC or the method for training a risk management model based on UGC according to the present application.

The memory 902 which is a non-transitory computer readable storage medium may be configured to store non-transitory software programs, non-transitory computer executable programs and modules, such as program instructions/modules corresponding to the method for processing risk-management feature factors based on UGC or the method for training a risk management model based on UGC according to the embodiments of the present application (for example, the relevant modules shown in FIGS. 6 to 8). The processor 901 executes various functional applications and data processing of a server, that is, implements the method for processing risk-management feature factors based on UGC or the method for training a risk management model based on UGC according to the above-mentioned embodiments, by running the non-transitory software programs, instructions, and modules stored in the memory 902.

The memory 902 may include a program storage area and a data storage area, wherein the program storage area may store an operating system and an application program required for at least one function; the data storage area may store data created according to use of the electronic device for implementing the method for processing risk-management feature factors based on UGC or the method for training a risk management model based on UGC, or the like. Furthermore, the memory 902 may include a high-speed random access memory, or a non-transitory memory, such as at least one magnetic disk storage device, a flash memory device, or other non-transitory solid state storage devices. In some embodiments, optionally, the memory 902 may include memories remote from the processor 901, and such remote memories may be connected to the electronic device for implementing the method for processing risk-management feature factors based on UGC or the method for training a risk management model based on UGC via a network. Examples of such a network include, but are not limited to, the Internet, intranets, local area networks, mobile communication networks, and combinations thereof.

The electronic device for implementing the method for processing risk-management feature factors based on UGC or the method for training a risk management model based on UGC may further include an input device 903 and an output device 904. The processor 901, the memory 902, the input device 903 and the output device 904 may be connected by a bus or other means, and FIG. 9 takes the connection by a bus as an example.

The input device 903 may receive input numeric or character information and generate key signal input related to user settings and function control of the electronic device for implementing the method for processing risk-management feature factors based on UGC or the method for training a risk management model based on UGC, such as a touch screen, a keypad, a mouse, a track pad, a touch pad, a pointing stick, one or more mouse buttons, a trackball, a joystick, or the like. The output device 904 may include a display device, an auxiliary lighting apparatus (for example, an LED) and a tactile feedback apparatus (for example, a vibrating motor), or the like. The display device may include, but is not limited to, a liquid crystal display (LCD), a light emitting diode (LED) display, and a plasma display. In some implementations, the display device may be a touch screen.

Various implementations of the systems and technologies described here may be implemented in digital electronic circuitry, integrated circuitry, ASICs (application specific integrated circuits), computer hardware, firmware, software, and/or combinations thereof. These various implementations may be implemented in one or more computer programs which are executable and/or interpretable on a programmable system including at least one programmable processor, and the programmable processor may be special or general, and may receive data and instructions from, and transmitting data and instructions to, a storage system, at least one input apparatus, and at least one output apparatus.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, programmable logic devices (PLDs)) for providing machine instructions and/or data to a programmable processor, including a machine readable medium which receives machine instructions as a machine readable signal. The term "machine readable signal" refers to any signal for providing machine instructions and/or data to a programmable processor.

To provide interaction with a user, the systems and technologies described here may be implemented on a computer having: a display apparatus (for example, a CRT (cathode ray tube) or LCD (liquid crystal display) monitor) for displaying information to a user; and a keyboard and a pointing apparatus (for example, a mouse or a trackball) by which a user may provide input to the computer. Other kinds of apparatuses may also be used to provide interaction with a user; for example, feedback provided to a user may be any form of sensory feedback (for example, visual feedback, auditory feedback, or tactile feedback); and input from a user may be received in any form (including acoustic, voice or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which are run on respective computers and have a client-server relationship to each other.

According to the technical solution of the embodiments of the present application, the feature expression of the UGC is generated based on the UGC; the risk-management feature factors of the UGC are extracted according to the pre-generated risk-management-feature-factor extracting model and the feature expression of the UGC; compared with the prior art, the risk-management feature factors of the corresponding user may be extracted based on the UGC without depending on the privacy information of the user, such as the personal basic attributes, or the like, such that the subsequent related processing actions of the risk management may be facilitated, the acquiring way and the acquiring mode of the risk-management feature factors may be enriched effectively, and richer information of the risk-management feature factors may be acquired.

According to the technical solution of the embodiments of the present application, the risk-management-feature-factor extracting model may be generated in the above-mentioned way, and then, the risk-management feature factors may be extracted based on the UGC, such that even when the privacy information of the user, such as the personal basic attributes, or the like, is unable to be acquired in the prior art, the corresponding risk-management feature factors are able to be extracted based on the UGC of the user, related processing actions of risk management may be performed without depending on the personal basic attributes of the user, and the flexibility of the processing actions of the risk management may be improved effectively.

According to the technical solution of the embodiments of the present application, the various types of bags of words may be mined in the above-mentioned way, the words included in the various types of bags of words may be quite rich and comprehensive, and then, the risk-management-feature-factor extracting model may be trained more accurately and effectively based on the various types of bags of words.

According to the technical solution of the embodiments of the present application, in the above-mentioned way, the risk-management feature factors of the corresponding user may be extracted based on the UGC without depending on the privacy information of the user, such as the personal basic attributes, or the like, and whether this user has a risk may be predicted based on the pre-trained risk management model, such that risk management may be timely performed subsequently based on the prediction result, and effective risk management may be performed based on the UGC of the user without depending on the privacy information of the user, such as any personal basic attribute, or the like, with quite flexible and convenient utilization.

According to the technical solution of the embodiments of the present application, the risk management model may be trained based on the extracted risk-management feature factors of each UGC language material in the UGC corpus and the user risk information in the user information base; compared with the prior art, the risk management model is trained based on the UGC language material of the user without depending on the privacy information of the user, such as the personal basic attribute information, or the like, thus having quite high flexibility and a quite wide application range, and meeting requirements of training the risk management model in all fields in which the UGC data of the user may be acquired.

It should be understood that various forms of the flows shown above may be used and reordered, and steps may be added or deleted. For example, the steps described in the present application may be executed in parallel, sequentially, or in different orders, and are not limited herein as long as the desired results of the technical solution disclosed in the present application may be achieved.

The above-mentioned embodiments are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

What is claimed is:

1. A method for processing risk-management feature factors based on user generated content (UGC), wherein the method comprises:
generating a feature expression of the UGC based on the UGC; and
extracting the risk-management feature factors of the UGC according to a pre-generated risk-management-feature-factor extracting model and the feature expression of the UGC,
wherein before extracting the risk-management feature factors of the UGC according to a pre-generated risk-management-feature-factor extracting model and the feature expression of the UGC, the method further comprises:
generating a feature expression of each UGC language material comprised in a pre-collected UGC corpus based on the UGC corpus;
acquiring a bag-of-words type probability expression of each UGC language material in the UGC corpus based on various types of pre-generated bags of words, wherein the bag-of-words type probability expression is able to identify the probabilities that the UGC language materials belong to the types of the various bags of words;
training a bag-of-words type predicting model based on the feature expression of each UGC language material in the UGC corpus and the corresponding bag-of-words type probability expression; and
removing a last output layer from the trained bag-of-words type predicting model, and generating the risk-management-feature-factor extracting model by taking the feature expressions obtained before the last output layer as the risk-management feature factors
wherein after extracting the risk-management feature factors of the UGC according to a pre-generated risk-management-feature-factor extracting model and the feature expression of the UGC, the method further comprises:
predicting whether a user corresponding to the UGC has a risk according to the risk-management feature factors of the UGC and a pre-trained risk management model.

2. The method according to claim 1, wherein acquiring a bag-of-words type probability expression of each UGC language material in the UGC corpus based on various types of pre-generated bags of words comprises:
mining the probabilities that each UGC language material in the UGC corpus belongs to the types of the various types of pre-generated bags of words based on the corresponding UGC language material and the various bags of words; and
splicing the probabilities that the UGC language materials belong to the types of the various bags of words to form the bag-of-words type probability expression of the UGC language materials.

3. The method according to claim 2, wherein mining the probabilities that each UGC language material in the UGC corpus belongs to the types of the various types of pre-generated bags of words based on the corresponding UGC language material and the various bags of words comprises:
mining the number of times each UGC language material in the UGC corpus hits the various types of pre-generated bags of words based on the corresponding UGC language material and the various bags of words; and
acquire the probabilities that the UGC language material belongs to the types of the various bags of words according to the number of times the UGC language material hits the various types of bags of words.

4. The method according to claim 2, wherein before mining the probabilities that each UGC language material in the UGC corpus belongs to the types of the various types of pre-generated bags of words based on the corresponding UGC language material and the various bags of words, the method further comprises:
mining various types of bags of words;
further, mining various types of bags of words comprises:
acquiring vector expressions of the type of the bag of words and each word in a preset word library with a pre-trained word vector expression model;
with the vector expression of the type of the bag of words as a clustering center, acquiring K words closest to the clustering center from the preset word library based on the vector expressions of the type of the bag of words and each word in the preset word library; and
adding the K words into the bag of words of the type.

5. The method according to claim 4, wherein after adding the K words into the bag of words of the type, the method further comprises:

updating the clustering center with the vector expressions of all the words comprised in the bag of words; acquiring the words closest to the updated clustering center from the preset word library, adding the words into the bag of words of the type, and repeating the steps until the number of the words comprised in the bag of words reaches the preset threshold.

6. The method according to claim 4, wherein the mining various types of bags of words further comprises:
acquiring a plurality of UGC language materials hitting the various types of bags of words from the UGC corpus;
performing word segmentation on the plural UGC language materials hitting the same type of bag of words, and counting the word frequency of each segmented word; and
adding the segmented word which has a word frequency greater than or equal to a preset frequency threshold but does not belong to the type of bag of words into the corresponding type of bag of words.

7. An electronic device, comprising:
at least one processor; and
a memory communicatively connected with the at least one processor;
wherein the memory stores instructions executable by the at least one processor, and the instructions are executed by the at least one processor to enable the at least one processor to perform a method for processing risk-management feature factors based on user generated content (UGC), wherein the method comprises:
generating a feature expression of the UGC based on the UGC; and
extracting the risk-management feature factors of the UGC according to a pre-generated risk-management-feature-factor extracting model and the feature expression of the UGC,
wherein before extracting the risk-management feature factors of the UGC according to a pre-generated risk-management-feature-factor extracting model and the feature expression of the UGC, the method further comprises:
  generating a feature expression of each UGC language material comprised in a pre-collected UGC corpus based on the UGC corpus;
  acquiring a bag-of-words type probability expression of each UGC language material in the UGC corpus based on various types of pre-generated bags of words, wherein the bag-of-words type probability expression is able to identify the probabilities that the UGC language materials belong to the types of the various bags of words;
  training a bag-of-words type predicting model based on the feature expression of each UGC language material in the UGC corpus and the corresponding bag-of-words type probability expression;
  removing a last output layer from the trained bag-of-words type predicting model, and generating the risk-management-feature-factor extracting model by taking the feature expressions obtained before the last output layer as the risk-management feature factors,
wherein after extracting the risk-management feature factors of the UGC according to a pre-generated risk-management-feature-factor extracting model and the feature expression of the UGC, the method further comprises:
  predicting whether a user corresponding to the UGC has a risk according to the risk-management feature factors of the UGC and a pre-trained risk management model.

8. The electronic device according to claim 7,
wherein acquiring a bag-of-words type probability expression of each UGC language material in the UGC corpus based on various types of pre-generated bags of words comprises:
mining the probabilities that each UGC language material in the UGC corpus belongs to the types of the various types of pre-generated bags of words based on the corresponding UGC language material and the various bags of words; and
splicing the probabilities that the UGC language materials belong to the types of the various bags of words to form the bag-of-words type probability expression of the UGC language materials.

9. The electronic device according to claim 8, wherein mining the probabilities that each UGC language material in the UGC corpus belongs to the types of the various types of pre-generated bags of words based on the corresponding UGC language material and the various bags of words comprises:
mining the number of times each UGC language material in the UGC corpus hits the various types of pre-generated bags of words based on the corresponding UGC language material and the various bags of words; and
acquiring the probabilities that the UGC language material belongs to the types of the various bags of words according to the number of times the UGC language material hits the various types of bags of words.

10. The electronic device according to claim 8,
wherein before mining the probabilities that each UGC language material in the UGC corpus belongs to the types of the various types of pre-generated bags of words based on the corresponding UGC language material and the various bags of words, the method further comprises:
mining various types of bags of words;
further, mining various types of bags of words comprises:
acquiring vector expressions of the type of the bag of words and each word in a preset word library with a pre-trained word vector expression model;
with the vector expression of the type of the bag of words as a clustering center, acquiring K words closest to the clustering center from the preset word library based on the vector expressions of the type of the bag of words and each word in the preset word library; and
adding the K words into the bag of words of the type.

11. The electronic device according to claim 10,
wherein after adding the K words into the bag of words of the type, the method further comprises:
updating the clustering center with the vector expressions of all the words comprised in the bag of words; acquiring the words closest to the updated clustering center from the preset word library, adding the words into the bag of words of the type, and repeating the steps until the number of the words comprised in the bag of words reaches the preset threshold.

12. The electronic device according to claim 10, wherein the mining various types of bags of words further comprises:
acquiring a plurality of UGC language materials hitting the various types of bags of words from the UGC corpus;

performing word segmentation on the plural UGC language materials hitting the same type of bag of words, and count the word frequency of each segmented word; and adding the segmented word which has a word frequency greater than or equal to a preset frequency threshold but does not belong to the type of bag of words into the corresponding type of bag of words.

13. A non-transitory computer-readable storage medium storing computer instructions therein, wherein the computer instructions are used to cause the computer to perform a method for processing risk-management feature factors based on user generated content (UGC), wherein the method comprises:

generating a feature expression of the UGC based on the UGC; and extracting the risk-management feature factors of the UGC according to a pre-generated risk-management-feature-factor extracting model and the feature expression of the UGC, wherein before extracting the risk-management feature factors of the UGC according to a pre-generated risk-management-feature-factor extracting model and the feature expression of the UGC, the method further comprises:

generating a feature expression of each UGC language material comprised in a pre-collected UGC corpus based on the UGC corpus;

acquiring a bag-of-words type probability expression of each UGC language material in the UGC corpus based on various types of pre-generated bags of words, wherein the bag-of-words type probability expression is able to identify the probabilities that the UGC language materials belong to the types of the various bags of words;

training a bag-of-words type predicting model based on the feature expression of each UGC language material in the UGC corpus and the corresponding bag-of-words type probability expression;

removing a last output layer from the trained bag-of-words type predicting model, and generating the risk-management-feature-factor extracting model by taking the feature expressions obtained before the last output layer as the risk-management feature factors, wherein after extracting the risk-management feature factors of the UGC according to a pre-generated risk-management-feature-factor extracting model and the feature expression of the UGC, the method further comprises:

predicting whether a user corresponding to the UGC has a risk according to the risk-management feature factors of the UGC and a pre-trained risk management model.

* * * * *